United States Patent [19]

Denecke

[11] Patent Number: 5,601,940
[45] Date of Patent: Feb. 11, 1997

[54] BATTERY HOLDER

[75] Inventor: Henry M. Denecke, N. Hollywood, Calif.

[73] Assignee: Denecke, Inc., North Hollywood, Calif.

[21] Appl. No.: 439,288

[22] Filed: May 11, 1995

[51] Int. Cl.$^6$ ..................................... H01M 2/10
[52] U.S. Cl. .............................. 429/100; 429/96; 429/97; 429/163
[58] Field of Search ................................ 429/96, 97, 100, 429/163

[56] References Cited

U.S. PATENT DOCUMENTS 3,301,712  1/1967  Bach ........................................ 429/100
4,752,539  6/1988  Vatter ............................................ 429/1
4,991,225  2/1991  Holcomb et al. ........................... 455/90
5,372,395  12/1994  Yang ......................................... 292/147

Primary Examiner—Stephen Kalafut
Assistant Examiner—Richard H. Lilley, Jr.
Attorney, Agent, or Firm—Drucker & Sommers

[57] ABSTRACT

The battery holder enables rapid insertion and removal of a battery relative thereto. An open portion of the holder provides ready access for rapid and efficient battery insertion and removal. Biased contacts and a protruding lip portion at opposite ends of the battery holder securely retain the battery therein.

22 Claims, 2 Drawing Sheets

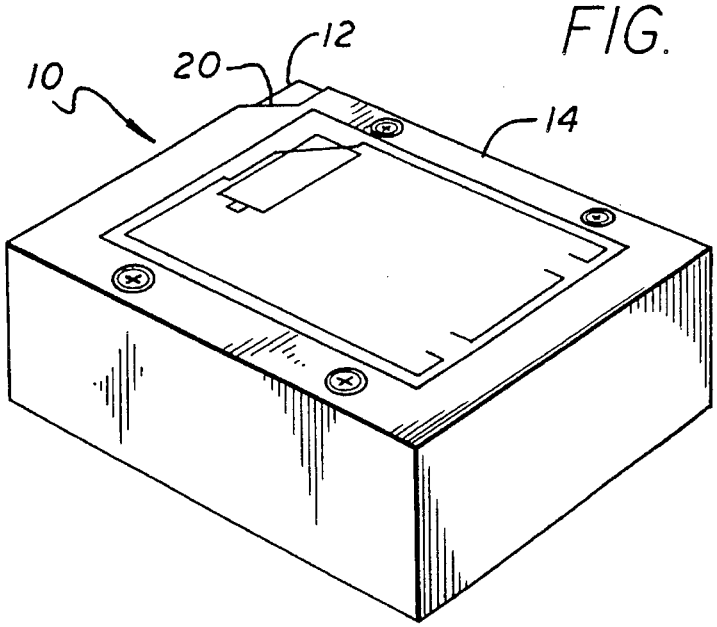
FIG. 1
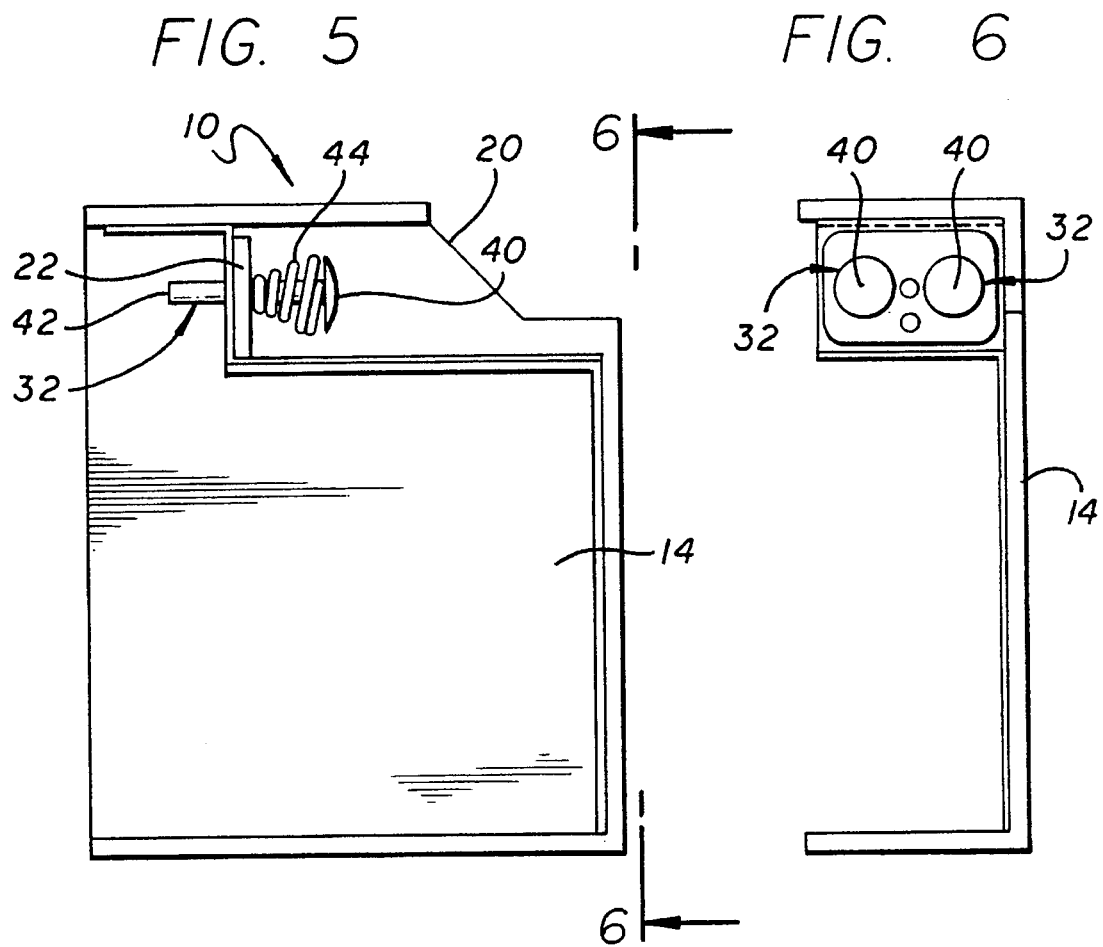
FIG. 5
FIG. 6

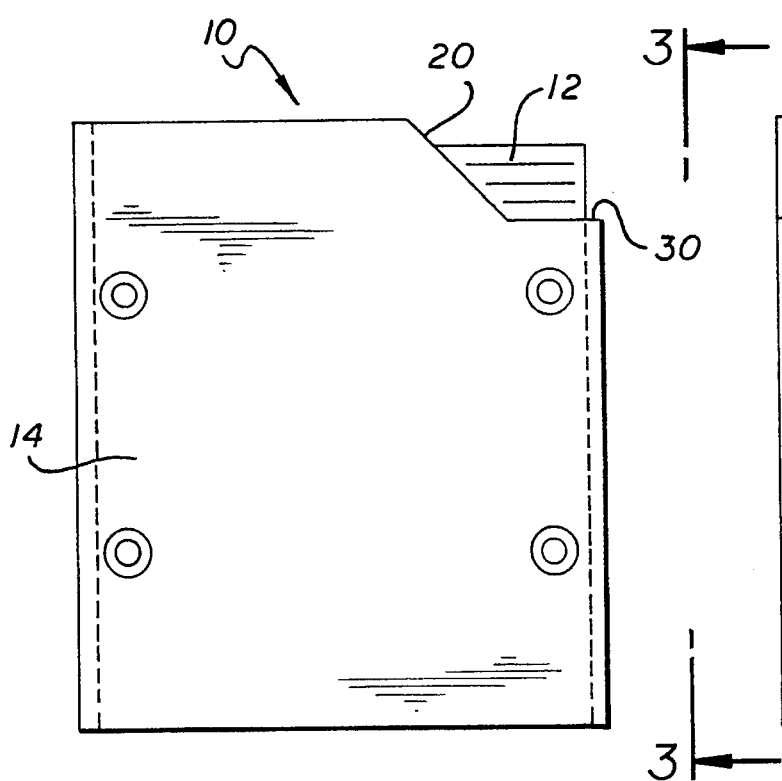
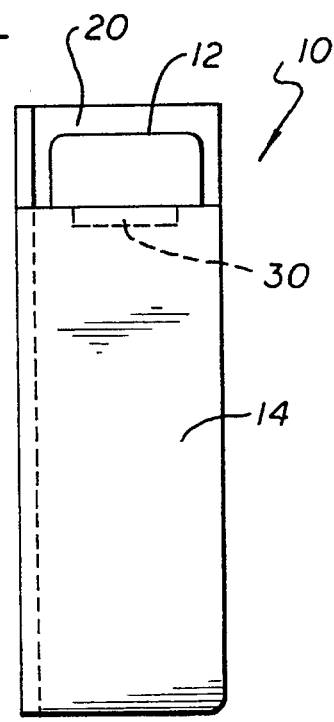
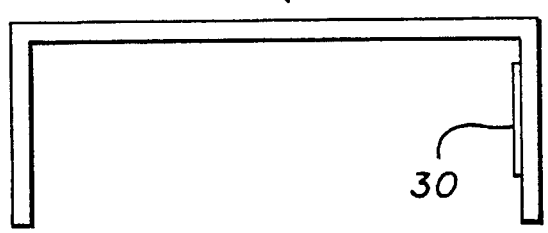

BATTERY HOLDER

BACKGROUND OF THE INVENTION

1. Field of the Invention

This invention relates generally to holders for power supplies. It relates specifically to a holder for enabling rapid insertion and removal of a battery.

2. Description of the Related Art

Housings for battery-operable devices include compartments for holding the battery.

However, such compartments are enclosed by a pivoted or slidable closure member, and require pivoting or sliding of the closure for access thereinto to install, remove, or replace the battery.

Such battery holders are not readily accessible, preventing efficient installation, removal and replacement of the battery.

SUMMARY OF THE INVENTION

The battery holder of the invention overcomes the above problems and others associated with prior battery holders.

It includes an open portion of the battery holder, through which ready access is provided for enabling rapid and efficient insertion and removal of the battery.

It further includes elements at opposed ends of the battery holder, for providing secure biased retention of the battery in the holder after the battery has been inserted therein through the battery holder open portion.

DESCRIPTION OF THE DRAWINGS

FIG. 1 is a perspective view of a housing including the battery holder of the invention, with a battery installed therein;

FIG. 2 is a top plan view thereof;

FIG. 3 is a side elevational view thereof taken on line 3—3 of FIG. 2;

FIG. 4 is a side view thereof taken on line 4—4 of FIG. 2;

FIG. 5 is a top plan sectional view of the housing and battery holder without a battery installed therein; and FIG. 6 is a side sectional view thereof taken on line 6—6 of FIG. 5.

DESCRIPTION OF THE PREFERRED EMBODIMENT

The invention comprises a battery holder 10, for releasably retaining a battery 12 therein. Battery holder 10 may be a portion of a housing 14, where the other portion of housing 14 includes circuitry operable by battery 12.

Battery holder 10 includes an open portion 20 of housing 14 for enabling insertion and removal of battery 12 therethrough, as shown in FIGS. 1–3 and 5. It further includes a base portion 22, as shown in FIG. 5.

Battery holder 10 further includes elements for releasably retaining battery 12 in housing 14. The retaining elements include a projecting lip portion 30 of housing 14, as shown in FIGS. 2 and 3. It further includes elements for biasing battery 12 into contact with projecting lip portion 30. The biasing elements preferably include a pair of contacts 32 for engaging battery 12, as shown in FIGS. 5 and 6.

Battery 12 may be a standard battery with a single contact at one end thereof, or preferably a nine-volt battery with a pair of contacts at one end thereof.

Contact 32 may be a single contact adapted to be engaged by a single contact in a standard battery, or preferably a pair of contacts 32 are adapted to be engaged by a pair of contacts in a nine-volt battery. Each of the pair of contacts may preferably be the same size and shape, when circuitry is provided in housing 14 which includes protection against reverse polarity battery installation.

Contacts 32 each include a head portion 40 which is round with flattened center portions, and a pin 42, from one end of which head portion 40 extends. Pin 42 is reciprocally movable through base 22 in housing 14, and is biased outwardly from base 22 by spring 44. Spring 44 is preferably a coil spring.

To install battery 12, it is inserted in battery holder 10 through open portion 20 with the battery contacts contacting holder 32. The base of battery 12 is pressed forward by the user, pushing battery 12 into batter holder 10 against the biasing contact springs 44 until a portion of the battery base is under the holder protruding lip 30. The battery is released, and is retained between pressure exerted by contacts 32 and projecting lip 30. To remove battery 12, this process is reversed.

Open portion 20 of the battery holder 10 in housing 14 provides ready access for enabling efficient installation and removal of battery 12. Protruding lip 30 and contacts 32 biased by springs 44 in battery holder 10 securely retain battery 12 after it has been inserted therein.

A preferred embodiment of the invention has been shown set forth above, for purposes of explaining the invention. However, it is to be understood that variations in such embodiment may be made which are nevertheless within the scope and spirit of the invention as set forth in the claims.

I claim:

1. A battery holder, for enabling insertion and removal of a battery which includes a polarity contact at one end thereof for supplying battery power to a device, adapted to releasably retain the battery therein, and to enable contact with the polarity contact of the battery for electrical connection thereof, comprising:

(a) a housing for the battery, including means for enabling insertion, retention, and removal of the battery comprising an opening in the housing for enabling insertion and removal of the battery and a portion of the housing which extends over a portion of the battery upon insertion of the battery into the housing for enabling retention of the battery in the housing; and (b) means in the housing for contacting the polarity contact of the battery for enabling electrical connection thereof.

2. A battery holder as in claim 1, in which the contacting means include means for biasing the battery into contact with the housing extending portion.

3. A battery holder as in claim 2, in which the contacting means include a pin which includes a contact at one end thereof.

4. A battery holder as in claim 3, in which housing includes a base through which the pin projects for enabling reciprocal movement thereof.

5. A battery holder as in claim 4, in which the biasing means comprise a coil spring extending about the pin between the housing base and the pin contact.

6. A battery holder as in claim 3, in which the pin contacts are adapted to be directly engageable with the battery polarity contacts.

7. A battery holder as in claim 1, in which the battery includes a plurality of polarity contact, and the contacting means comprise a plurality of contacts for contacting the battery polarity contacts.

8. A battery holder as in claim 1, in which the housing includes first and second adjacent sides, and the opening extends intermediate and at an angle to the adjacent first and second sides of the housing.

9. A battery holder as in claim 8, in which the battery includes a width, the housing opening includes a width, and the width of the housing opening is greater than the width of the battery, for enabling insertion and removal of the battery therethrough.

10. A battery holder as in claim 9, in which the battery further includes a length, the housing opening enables insertion of the battery therethrough into a position in which the length of the battery is substantially parallel to the first adjacent side, the housing opening includes a width along the second adjacent side of the housing the width of the housing opening along the second adjacent side of the housing is less than the width of the battery, and the housing extending portion comprises a portion of the second adjacent side of the housing which extends over a portion of the battery upon insertion of the battery into the housing to retain the battery in the housing.

11. A battery holder as in claim 8, in which the biasing means bias the battery towards the housing second adjacent side extending portion.

12. A battery holder, for enabling insertion and removal of a battery which includes a plurality of polarity contacts at one end thereof for supplying battery power to a device, adapted to releasably retain the battery therein, and to enable contact with the polarity contacts of the battery for electrical connection thereof, comprising:

(a) a housing for the battery, including means for enabling insertion, pivoting, retention, pivoting, and removal of the battery; and (b) means in the housing for contacting the polarity contacts of the battery for enabling electrical connection thereof.

13. A battery holder as in claim 12, in which the housing includes a projecting lip portion adjacent the open portion, which comprises the retaining means.

14. A battery holder as in claim 12, in which the contacting means include means for biasing the battery into contact with the housing extending portion.

15. A battery holder as in claim 14, in which the contacting means include a pin which includes a contact at one end thereof.

16. A battery holder as in claim 15, in which housing includes a base through which the pin projects for enabling reciprocal movement thereof.

17. A battery holder as in claim 16, in which the biasing means comprise a coil spring extending about the pin between the housing base and the pin contact.

18. A battery holder as in claim 15, in which the pin contact is adapted to be directly engageable with the battery polarity contact.

19. A battery holder as in claim 12, in which the housing includes first and second adjacent sides, and the opening extends intermediate and at an angle to the adjacent first and second sides of the housing.

20. A battery holder as in claim 19, in which the battery includes a width, the housing opening includes a width, and in which the width of the housing opening is greater than the width of the battery, for enabling insertion and removal of the battery therethrough.

21. A battery holder as in claim 20, in which the battery further includes a length, the housing opening enables insertion of the battery therethrough into a position in which the length of the battery is substantially parallel to the first adjacent side, the housing opening includes a width along the second adjacent side of the housing, the width of the housing opening along the second adjacent side of the housing is less than the width of the battery, and the housing extending portion comprises a portion of the second adjacent side of the housing which extends over a portion of the battery upon insertion of the battery into the housing to retain the battery in the housing.

22. A battery holder as in claim 19, in which the biasing means bias the battery towards the housing second adjacent side extending portion.

\* \* \* \* \*